L. J. NORTHERN.
METALLIC SPRING TIRE.
APPLICATION FILED JAN. 26, 1918.
1,262,550.
Patented Apr. 9, 1918.
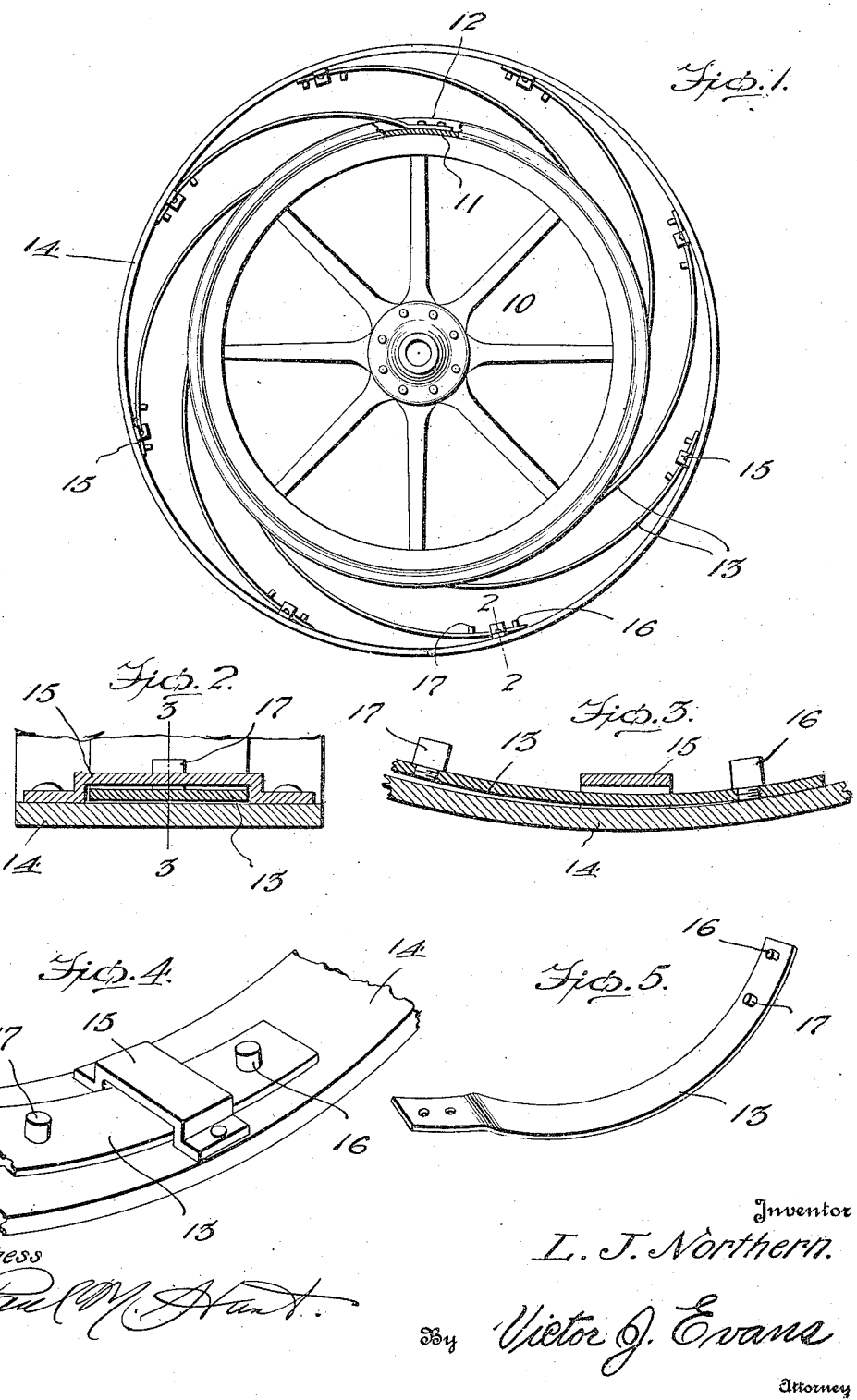

UNITED STATES PATENT OFFICE.

LOUIS J. NORTHERN, OF GREENBURG, KANSAS.

METALLIC SPRING-TIRE.

1,262,550.

Specification of Letters Patent.   Patented Apr. 9, 1918.

Application filed January 26, 1918.  Serial No. 213,943.

*To all whom it may concern:*

Be it known that I, LOUIS J. NORTHERN, a citizen of the United States, residing at Greenburg, in the county of Kiowa and State of Kansas, have invented new and useful Improvements in Metallic Spring-Tires, of which the following is a specification.

This invention relates to improvements in vehicle wheels, and refers more particularly to an improved construction used in connection with the rim of a wheel which is designed to give resiliency to the wheel and whereby the wheel will have all of the advantages of a pneumatic tire without its objectionable features.

A further object of the invention is to produce a spring wheel of an extremely simple, cheap and effective construction.

Other objects and advantages will appear as the nature of the invention is better understood, reference being had to the accompanying drawings, in which, Figure 1 is a side elevation of a spring wheel constructed in accordance with this invention.

Fig. 2 is a sectional view approximately on the line 2—2 of Fig. 1, upon an enlarged scale.

Fig. 3 is a sectional view approximately on the line 3—3 of Fig. 2.

Fig. 4 is a perspective view of a portion of the tire rim or tread looking toward the inner face thereof.

Fig. 5 is a perspective view of one of the spring members employed.

As disclosed by the drawings the wheel 10 is of the ordinary class employed on automobiles, and such like vehicles. On the felly of the wheel is secured the ordinary tire carrying rim 11 which has its outer periphery channeled in the usual manner to receive pneumatic tires, and which channel forms the opposite sides thereof with the usual flanges 12. Secured between the flanges 12 of the rim 11, at desired intervals, are the ends of flat curved springs 13.

Surrounding the rim 11 is the outer tread rim 14. This rim is spaced a suitable distance from the inner rim 11 and preferably comprises a member which is flat in transverse section. The outer rim 14, upon its inner periphery has secured thereon a plurality of transversely arranged yoke shaped brackets 15, corresponding in number with the springs employed. The rim 14 is of a considerably greater width than the rim 11, and each of the springs 13 has its outer end playing freely through one of the yokes of each of the brackets 15. Each of the springs, upon its outer end has removably connected thereto an inwardly extending lug 16, and may be and preferably is provided, at a suitable distance inward of the lug 16 with an additional removable lug 17. The lugs 16 and 17 contacting with the opposite sides of the brackets limit the movement of the springs through the brackets, and from the foregoing description, when taken in connection with the drawings, the simplicity and advantages of the construction, it is believed, will be apparent without further detailed description.

What I claim is:

In a device for the purpose set forth, a wheel having a channeled rim secured to the felly thereof, arched springs having their inner ends secured in the channel of the rim, an outer rim surrounding the inner rim and of a width greater than that of the inner rim, yoke shaped brackets arranged transversely of the inner periphery of the outer rim and secured thereto, the outer end of each of the springs designed to pass freely through the yoke of one of the brackets, a removable lug upon the outer end of each of the springs, and a removable lug on each of the springs spaced inwardly of the first mentioned lug, and said lugs arranged to contact with the opposite sides of the brackets to limit the movement of the springs through the brackets in both directions.

In testimony whereof I affix my signature.

LOUIS J. NORTHERN.

Copies of this patent may be obtained for five cents each, by addressing the "Commissioner of Patents, Washington, D. C."